United States Patent Office 3,567,461
Patented Mar. 2, 1971

3,567,461
DIETETIC LOW PROTEIN BREAD MIX AND
BREAD PRODUCED THEREFROM
Donald A. Wernecke, Minneapolis, Minn., assignor to
General Mills, Inc.
No Drawing. Continuation-in-part of application Ser. No.
701,056, Jan. 29, 1968. This application May 28, 1969,
Ser. No. 828,726
Int. Cl. A21d 13/06
U.S. Cl. 99—90                                    3 Claims

ABSTRACT OF THE DISCLOSURE

A dietetic low protein bread mix comprised of fat, sugar, wheat starch containing wheat gluten, and a structure enhancer added to the mix to produce a low protein content bread having a structure, taste, and appearance similar to that of conventional white bread.

---

This application is a continuation-in-part of my co-pending application, U.S. Ser. No. 701,056, filed Jan. 29, 1968, now abandoned.

The product of my invention is a dietetic low protein bread mix. The bread mix is comprised of wheat starch, sugar, shortening, and a structure preservative and is designed to be similar to conventional gluten-containing bread in taste, structure and appearance.

The product of my invention is designed to enable people on diets restricted in protein or specific amino acids to benefit from and enjoy a highly palatable, low protein bread. Examples of people who must restrict or modify their protein intake are: (1) those suffering from celiac disease and non-tropical sprue, i.e. those who must restrict their intake of certain specific grain proteins, (2) individuals suffering from PKU or phenylketonuriac disorders, i.e. those who must reduce their intake of the amino acid phenylalanine, and (3) those suffering from uremia or severe kidney disorders, the latter class being unable to dispose of urea and other nitrogenous waste products due to kidney malfunction.

The problem of producing a palatable baking mix for bread acceptable to those suffering from uremia is the most difficult. Those suffering from celiac disease may have milk protein and milk protein aids significantly in bread production. This is not so with uremia sufferers because these patients must severely limit their intake of all protein.

Uremia sufferers and others such as heart patients must restrict their intake of sodium and potassium. Because the mix of my invention uses yeast there is no sodium or potassium residues from chemical leavening agents. No salt needs to be added to my mix. Salt is normally added to control fermentation. Uncontrolled formentation in a gluten containing bread is not desirable because the gluten must be aged to fully attain its elastic properties and if it is not it will not function properly as a cell structure elasticizer. Fermentation must therefore be slowed to allow the gluten to attain its desired properties and salt is used to slow this process. Since no gluten is used here yeast growth may be allowed to proceed normally and salt is not needed. As a matter of fact, my mix has a sodium content of about 38 mg. Na/100 gms. of mix. (The mix containing 8.8% moisture.) This is compared to a conventional gluten bread which contains 507 mg. Na/100 gms. of bread (at 35.6% moisture). Also my mix has about 8 mg. of K/100 gms. as opposed to 105 mg. K/100 gms. using the moisture figures above.

It is, therefore, the purpose of my invention to produce a highly palatable bread similar in taste, texture and appearance to a common wheat gluten-containing bread which will provide a tasty part of the diet for those on limited protein, low sodium diets.

Although attempts have been made in the past to produce low protein bread by eliminating the gluten from wheat flour and by eliminating milk or milk protein from the bread mix, loaves made in this manner have proven to be unacceptable. These low protein loaves have a very close grained structure, lack the typical resiliency found in bread, are crumbly with a cake-like texture and are very dry and highly compact.

The product of my invention produces a baked loaf similar to bread in every way. The ingredients used for making this mix are sugar, preferably granulated, fat, preferably in the form of shortening, wheat starch, and a structure preservative selected from a class consisting of pectin, pregelatinized waxy maize starch, pregelatinized tapioca starch, pregelatinized wheat starch, methyl cellulose, and carboxymethyl cellulose.

The wheat starch used is commercially available and is usually made by subjecting wheat flour to a series of water washing steps to separate the starch from the gluten. An example of this type of wheat starch is the product sold by General Mills, Inc. under the trademark "Paygel."

The structure enhancer or structure preservative is designed to perform a function similar to the gluten and other proteins present in conventional bread. Bread normally contains a specific type of wheat gluten noted for its elasticity. It often contains milk protein. The gluten and added milk protein provide elasticity of structure to the cell walls of the foam created when the dough is subjected to a leavening agent. By providing this strength and resiliency, gas produced during the leavening process is able to expand the cell walls to a point where the bread rises and a soft, springy, relatively open even cell structure characteristic of bread is present on the inside of the loaf. The outside of a normal bread loaf is characterized by a smooth tan or brown color with no apparent fissures on the surface due to uneven cell wall expansion. Therefore, this smoothness is also enhanced by the presence of protein.

I have found that by mixing a low protein wheat starch, sugar and shortening with one of our structural enhancing agents I am able to produce a low protein bread which has an even cell structure, a smooth brownish crust, a fair degree of resiliency and elasticity, an open crumb structure, and a moist white inner surface thereby producing a loaf highly similar in every respect to normally available gluten-containing wheat bread. Other related, binding agents such as pregelatinized corn, potato, and arrowroot starch and vegetable bums such as caragenan do not provide the desired results. Some of these agents settle to the bottom of the loaf, others do not retain sufficient moisture or else they produce a loaf which is unappetizing in color, while others do not provide sufficient strength for proper rising of the bread or result in uneven expansion leaving fissures on the crust and/or throughout the interior of the loaf.

The importance of my invention cannot be over emphasized. Most people who suffer from disorders requiring reduction or modification of protein intake are on extremely limited diets. For example, those suffering from uremia are restricted to as low as 20 grams of protein per day. An example of such a diet is the Giovanetti diet. (Giovanetti, S. and Maggiore, Q.; A Low Nitrogen Diet with Proteins of High Biological Value for Severe Chronic Uraemia, Lancet, vol. 1, pages 1000 to 1003, May 1964). Bread is a significant part of the American adaptation of this diet and low protein bread based on a wheat starch-containing mixture is strongly recommended. However, the disadvantages of this bread from a palatability standpoint have been previously pointed out. Since the bread produced from the mix of my invention has approximately less than 10%, and preferably less than 6% of the protein in the conventional enriched white bread (about 3.8 gms. for a 1.75 pound loaf of *our* bread) and still is tasty and bread-like, the importance of my invention is obvious. A conventional 1.75 pound loaf of white bread contains approximately 8–9% protein.

Examples of the product of my invention follow. The procedure for preparing the mix, the proofing and the baking conditions were the same for all of the examples below. First, a premix was made consisting of:

|  | Percent |
|---|---|
| Wheat starch (0.3% protein) | 86.69 |
| Sugar (granulated) | 7.08 |
| Shortening | 6.23 |

To this premix was added the structure enhancer (the amounts of the structure enhancer will be given as percent of the total dry mix excluding yeast). Preferably, the resulting mix of our invention has a maximum wheat gluten content of about 0.3% by weight, of the mix. The mix was added to an aqueous yeast solution, the yeast being present at a level of 4% by weight of the starch and the amount of water sufficient to make a dough, here an amount about equal in weight to the mix. The mix and the yeast solution were then blended till homogeneous at low speeds in a conventional mixer. The bowl was scraped with a rubber blade and blending was then continued for ½ minute at medium speed. The dough was then poured into greased pans and allowed to proof at a relative humidity of 80–85% until the pans, which were initially half full, were full to the top with dough. This proofing generally takes about 30 minutes. The dough was then baked in a conventional oven at 400° F. for 30 minutes. Of the total protein content, less than one-half was due to the gluten in the wheat starch.

EXAMPLE I

A number of loaves were prepared by the procedure outlined above. Each loaf contained one of the structure enhancers at the levels indicated below:

| Structure enhancer: | Percent |
|---|---|
| Pectin (highly purified, unmodified) | 0.5, 1.0 |
| Waxy maize (pregelatinized) | ¹ 2–10 |
| Tapioca starch (pregelatinized) | ¹ 2–10 |
| Wheat starch (pregelatinized) | 5 |
| Methylcellulose | 0.5, 2 |
| Carboxymethylcellulose | 0.25, 2 |

¹ In 1% gradations.

When waxy maize or tapioca was used, it provided the best loaf at a 5% level and outside of the shiny appearance of the inside crumb structure was adjudged identical with the 5% wheat starch sample. Moisture levels were taken after 20 hours of storage at ambient temperature on the 5% tapioca starch loaf and the loaf was found to contain 43.5% moisture. At a level of 10% the loaf developed a more open crumb structure and was noticeably more moist than the loaf containing the 2% level. This was true with all of the loaves as the level of structure enhancer increased.

The major difference between the pectin, carboxymethyl celluclose and methyl cellulose loaves in this example were crumb structure and moisture following the pattern of the caveat above. Both cellulose derivatives and pectin provide to be useful at lower levels. Within the ranges given for the particular mix formulation the 10% waxy maize and tapioca loaf showed more of a wide open crumb structure than loaves containing either 2% of the cellulose derivatives or 1% pectin. Therefore, an increase of up to about 50% of the amount in the above table of either the cellulose derivatives or pectin is possible if these structural enhancers are used and an open crumb structure is desired.

All of the samples showed excellent moisture retention i.e. 43.5% by weight of the loaf for 5% tapioca after 20 hours at room temperature, good leavening and crumb structure, desirable color both inside and outside the loaf. The pregelatinized starch containing samples produced loaves with the best crust color. The loaf containing pectin produced a crust color less brown than the loaves containing pregelatinized starch but better than the loaves containing cellulose derivatives, although the crust color on the latter loaves were still deemed acceptable.

The pectin containing mix also produced a loaf which rose higher in the middle than any of the other loaves thereby producing a loaf more nearly approximating the exact configuration of a conventional gluten containing wheat bread loaf.

Pectin at a level of 0.5% and the methylcellulose present at levels as low as 0.5% produced binding characteristics superior to a 2% level of tapioca or waxy maize. For a relatively dense loaf which has a uniform crumb structure but is still not crumbly, a reduction up to about 50% in the amounts of these enhancers is possible.

The embodiments of the invention in which an exclusive property or privilege is claimed are defined as follows.

I claim:

1. A dietetic low protein bread mix comprised of wheat starch containing wheat gluten, fat, sugar and a structure enhancer selected from the group consisting of about: 0.5–1% pectin, 2–10% pregelatinized waxy maize, 2–10% pregelatinized tapioca starch, 5% pregelatinized wheat starch, 0.5–2% methylcellulose, and 0.25–2% carboxymethylcellulose, said amounts of the enhancer being percent by weight of the mix, said mix having a maximum wheat gluten content of about 0.3% by weight of the mix.

2. A dietetic low protein bread mix comprised of wheat starch containing wheat gluten, fat, sugar and a pregelatinized tapioca starch as a structure enhancer in an amount of about 2% by weight of the mix, said mix having a maximum wheat gluten content of about 0.3% by weight of the mix.

3. A low protein bread produced from the mix of claim 1.

References Cited

UNITED STATES PATENTS

| 2,043,139 | 6/1936 | Wille et al. | 99—90 |
| 2,086,184 | 7/1937 | Haas | 99—90 |
| 2,876,106 | 3/1959 | Jucaitis et al. | 99—90X |
| 3,348,951 | 10/1967 | Evans | 99—86 |

RAYMOND N. JONES, Primary Examiner

U.S. Cl. X.R.

99—94